Dec. 21, 1954  J. E. FESLER  2,697,479
COLLAPSIBLE AUTOMOBILE ARMREST
Filed Aug. 23, 1952
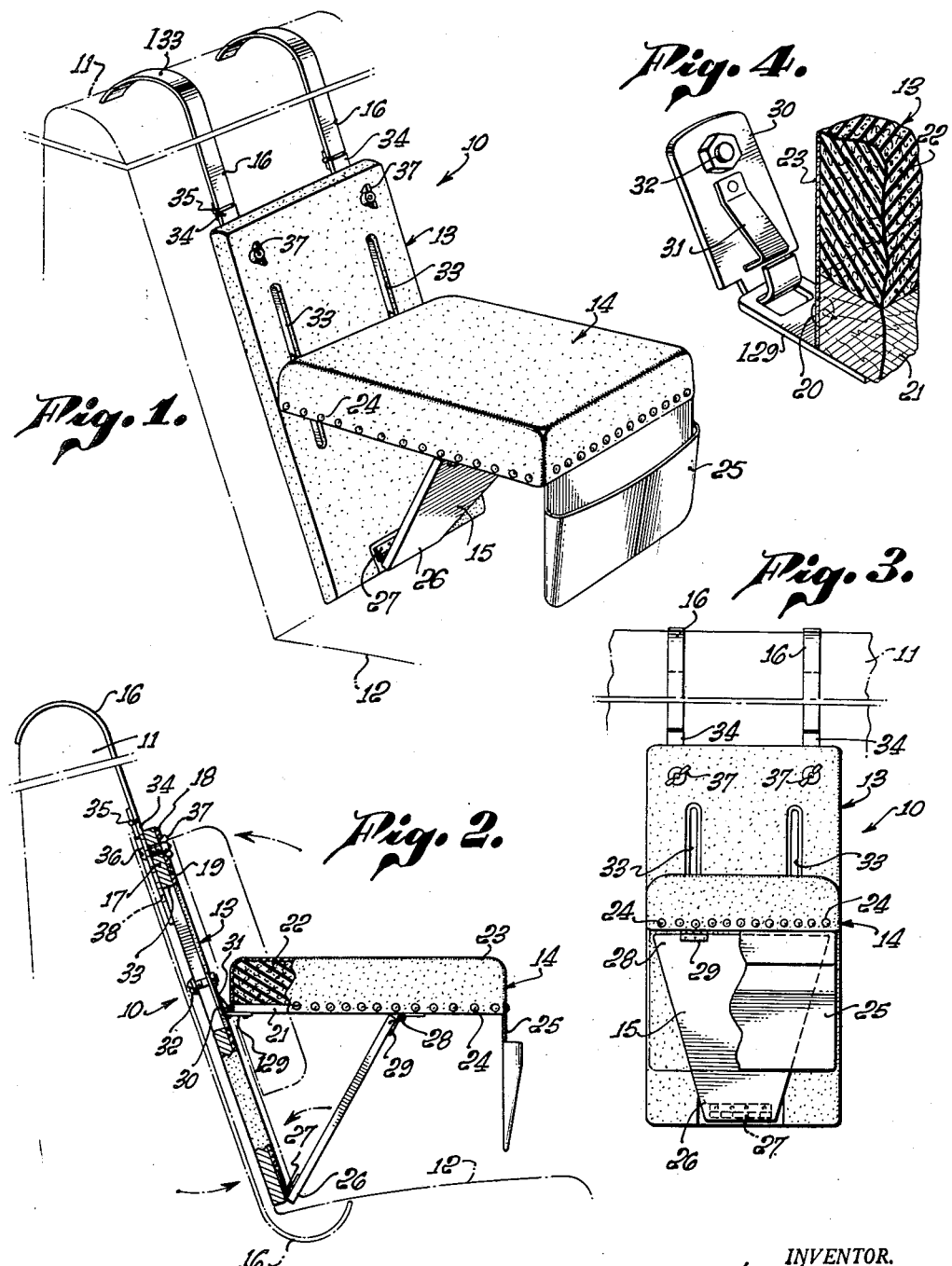
INVENTOR.
JAMES E. FESLER,
BY
ATTORNEY.

United States Patent Office 2,697,479
Patented Dec. 21, 1954

2,697,479

COLLAPSIBLE AUTOMOBILE ARMREST

James E. Fesler, Compton, Calif.

Application August 23, 1952, Serial No. 306,042

8 Claims. (Cl. 155—112)

This invention relates to improved arm rests for automobiles or other vehicles, and particularly to collapsible or retractible type arm rests.

A major object of the present invention is to provide a vehicle arm rest which is capable of being easily collapsed from an active position to a retracted position, and which is so constructed as to have great strength and rigidity in its active position, and to withstand extended use without damage. Particularly contemplated is an arm rest which may be removably attached to a car seat at any desired location and may be readily moved to different locations along the seat for greater flexibility of use. A further feature of the invention has to do with its formation in a manner to serve also as a receptacle for the storage of small articles at a location which is extremely handy to a user of the rest.

Structurally, an arm rest embodying the invention includes a support member, preferably extending vertically along the forward side of a car seat, a swinging brace member hinged near its lower end to the support member, and a rest member which is supported by the brace member. The arm rest member may be hinged to the upper end of the brace member to be movable between a vertically extending retracted position adjacent the seat back and a forwardly projecting active position. The rest member in its active position may be attached to the support member, desirably by a releasable and vertically adjustable connection.

I find it desirable to provide the support member with an upper hook or pair of hooks, which are receivable about the upper edge of a car seat back to suspend the arm rest unit therefrom. These hooks may be hinged to the support member for folding or collapsing movement relative thereto. As for the construction of the support member itself, it may comprise a flat board or the like containing a pair of vertical slots into which the vertically adjustable connections for the rear portion of the arm rest member are slidably connected.

In order to increase the utility of the arm rest unit, I desirably provide it with a pocket for receiving small articles and typically attached to a forward edge of the rest member. This pocket may be foldable relative to the arm rest member as it moves to retracted position, and for this purpose may be formed of a foldable flexible material.

The above and other features and objects of the present invention will be better understood from the following detailed description of the typical embodiment illustrated in the accompanying drawing, in which:

Fig. 1 is a perspective view of an automobile arm rest embodying the invention;

Fig. 2 is a side view partly in section of the Fig. 1 rest, showing in broken lines the collapsed positions of its various parts;

Fig. 3 is a front view of the Fig. 1 rest, with the forward pocket partially broken away; and Fig. 4 is an enlarged fragmentary perspective view, partly in section, of the parts for supporting the rear edge portion of the arm rest, and maintaining the rest in its active position.

The illustrated collapsible arm rest 10 is shown applied to the back 11 of a seat 12 in a conventional automobile or other vehicle. The rest unit includes a back 13, the arm rest member proper 14 which projects from back 13, an arm rest support member 15 and a pair of hooks 16 by which back 13 is suspended. The back 13 is formed of a rigid flat preferably rectangular member 17, which may be covered across its forward side and edges by a suitable flexible sheet 18 of plastic, cloth, leather or other covering material. Between rigid member 17 and its covering 18, the back may contain a layer of cotton or other padding 19. The covering 18 may be attached to rigid member 17 in any suitable manner, as by tacks 20, along the edges of the back. Rigid member 17 of the back may of course be formed of any of various materials, as for instance a wooden board cut to the desired shape, or a rigid molded plastic material.

The arm rest member 14 includes a rigid flat rectangular base member 21, which extends horizontally in its active position, and may be formed of the same wooden, plastic or other material as member 17 of back 13. Base member 21 may be cushioned at its upper side, as by a rectangular body of sponge rubber 22, which may be covered by a sheet of flexible plastic or other material 23. The covering material may be attached to base member 21 by tacks 24 spaced along the edge of member 21. At its forward edge, the arm rest member or unit 14 carries a depending flexible transverse pocket 25, which may be formed of the same flexible sheet material as the back and arm covers 18 and 23. Pocket 25 may typically be attached to the arm rest member by the same tacks 24 which fasten the forward edge of covering 23 to member 21.

The outer portion of arm rest member 14 is supported from back 13 by the previously mentioned rigid support member 15, which may be formed of wood, plastic or other suitable material. Member 15 is of trapezoidal configuration, having a lower reduced width end 26 movably attached by hinge 27 to the lower end of member 17 in back 13. From its lower end 26, support member 15 progressively increases in horizontal dimension to a width at its upper end 28 corresponding substantially to the width of arm rest member 14 and back 13. The upper end 28 of support member 15 is attached by hinges 29 to member 21 at a location toward the front edge of member 21. As will be understood, hinges 27 and 29 mount support member 15 and the arm rest member to the back for swinging movements between their active full-line positions of Fig. 2, and their retracted broken-line positions of extension alongside back 13. During such retracting movement, the material of pocket 25 flexes to the position shown in broken-lines in Fig. 2.

At its rear edge, base member 21 of the arm rest 14 carries a pair of rearwardly projecting eye elements 129 (see Fig. 4), releasably interengageable with a pair of hook elements 30 carried by back 13, to support the rear edge of the arm rest and maintain the rest in its active position. Eye elements 129 are releasably retained against disengagement from hook elements 30 by spring steel latches 31, which are resiliently deflectible rearwardly to permit disengagement of the hook and eye elements. Hook elements 30 are attached to back 13 by individual screws 32, which pass through a pair of vertically extending parallel slots 33 in the back. By loosening screws 32, hook elements 30 may be vertically adjusted along the extents of slots 33 to a proper height for maintaining arm rest 14 in a horizontal condition in an automobile of a particular seat contour. After adjustment to a proper height, hooks 30 are retained in the desired positions by tightening the nuts of screws 32.

The hook elements 16 may typically be formed of a suitable strip metal, desirably covered by rubber 133 at the curved portions of the hooks which extend about the upper edge of seat back 11. Hook 16 may be attached to back 13 by individual attaching elements 34, and are preferably hinged to elements 34 at 35 for folding movement relative to the back to the broken-line collapsed position of Fig. 2. Hook attaching elements 34 may be fastened to the back by screws 36, extending through the back and carrying wing nuts 37 at their forward ends. Preferably, each of the hook attaching elements 34 contains a vertical series of openings 38 for selectively receiving the corresponding screw 36, to permit vertical adjustment of the hooks relative to back 13.

In use, the unit is positioned against the forward side of the seat back with hooks 16 extending over its upper edge. The arm rest member 14 and support member 15 may then be extended to the illustrated full-line positions for use, or collapsed to the Fig. 2 broken-line positions when not in use. When the parts are in their full-line positions, a rider may rest his arm on cushion member 14, or may place articles within pocket 25.

I claim:

1. A vehicle arm rest comprising a rigid essentially planar back member adapted to extend across the forward side of a vehicle seat back, a brace member pivoted at a lower end to a lower portion of said back member for swinging movement between a retracted position adjacent the back member and an angular forwardly and upwardly extending active position, an arm rest member supported by said brace member in said active position thereof and movable between a retracted position adjacent said back member and an active forwardly projecting position, a pivotal connection between an upper end of said brace member and a forward portion of said arm rest member, said back member containing a pair of spaced vertically extending slots, a pair of connectors attached into said slots and vertically adjustable therein, and a second pair of connectors carried by a rear edge portion of said arm rest member and releasably attachable to said first connectors in the active position of the arm rest member to support its rear edge portion.

2. A vehicle arm rest comprising a rigid essentially planar back member adapted to extend across the forward side of a vehicle seat back, a pair of hooks projecting upwardly from said back member and receivable over the upper edge of the seat back to support the back member therefrom, a brace member pivoted at a lower end to a lower portion of said back member for swinging movement between a retracted position adjacent the back member and an angular forwardly and upwardly extending active position, an arm rest member supported by said brace member in said active position thereof and movable between a retracted position adjacent said back member and an active forwardly projecting position, a pivotal connection between an upper end of said brace member and a forward portion of said arm rest member, said back member containing a pair of spaced vertically extending slots, a pair of connectors attached into said slots and vertically adjustable therein, and a second pair of connectors carried by a rear edge portion of said arm rest member and releasably attachable to said first connectors in the active position of the arm rest member to support its rear edge portion.

3. A vehicle arm rest comprising a back member adapted to extend vertically along the forward side of a vehicle seat back, a brace member pivoted at a lower end to a lower portion of said back member for swinging movement between an active position extending forwardly and upwardly and a retracted rearwardly swung position near said back member, an arm rest member supported by said brace member in said active position thereof and movable between an active forwardly projecting position and a retracted position extending essentially vertically in front of said back member, a pivotal connection between an upper end of said brace member and said arm rest member, and a second connection attaching a rear portion of said arm rest member in active position to said back member and releasably retaining said rear portion of the arm rest member against vertical movement relative to the back member to thereby retain the arm rest member in active position, said rear portion of the arm rest member being vertically movable relative to the back member upon release of said second connection to permit retracting movement of the brace and arm rest member.

4. A vehicle arm rest as recited in claim 3, including means for vertically adjusting said second connection relative to said back member.

5. A vehicle arm rest as recited in claim 3, in which said second connection is constructed to permit detachment of said rear portion of the arm rest member from the back member.

6. A vehicle arm rest as recited in claim 3, in which said second connection comprises a vertically extending slot in said back member, a connector element attached into said slot and vertically adjustable therein, and a detachable connection between said connector element and said rear portion of the arm rest member.

7. A vehicle arm rest as recited in claim 3, including hook means attached to an upper portion of said back member and receivable over the upper edge of the seat back to support the back member therefrom.

8. A vehicle arm rest as recited in claim 7, including a means pivotally attaching said hook means to said back member for swinging movement downwardly relative thereto to a downwardly retracted position near the back member.

References Cited in the file of this patent

UNITED STATES PATENTS

| Number | Name | Date |
|---|---|---|
| 1,879,035 | Bell | Sept. 27, 1932 |
| 1,894,621 | Lehman | Jan. 17, 1933 |
| 2,043,626 | Morrison | June 9, 1936 |
| 2,123,695 | Elmer | July 12, 1938 |
| 2,551,701 | Prentice | May 8, 1951 |
| 2,557,556 | Morris | June 19, 1951 |
| 2,602,488 | Conning | July 8, 1952 |
| 2,633,906 | Franz | Apr. 7, 1953 |